(12) United States Patent
Atlas et al.

(10) Patent No.: US 7,849,916 B2
(45) Date of Patent: Dec. 14, 2010

(54) TEMPERATURE CONTROL APPARATUS AND METHOD

(75) Inventors: Boris Atlas, San Jose, CA (US); Yefim Bichutskiy, Sunnyvale, CA (US); Boris Bruk, San Jose, CA (US)

(73) Assignee: Noah Precision, LLC, Morgan Hill, CA (US)

( * ) Notice: Subject to any disclaimer, the term of this patent is extended or adjusted under 35 U.S.C. 154(b) by 1314 days.

(21) Appl. No.: 11/347,101

(22) Filed: Feb. 2, 2006

(65) Prior Publication Data

US 2007/0178020 A1 Aug. 2, 2007

(51) Int. Cl.
*G05D 23/00* (2006.01)
(52) U.S. Cl. .................... 165/287; 165/289; 165/292; 165/293; 165/300; 236/12.12
(58) Field of Classification Search ............... 165/11.1, 165/62, 287, 288, 289, 292, 293, 299, 300; 236/12.12
See application file for complete search history.

(56) References Cited

U.S. PATENT DOCUMENTS

| | | | |
|---|---|---|---|
| 4,135,571 A | 1/1979 | Tamblyn et al. | |
| 4,745,690 A | 5/1988 | Koop et al. | |
| 6,001,215 A | 12/1999 | Ban | |
| 6,350,322 B1 | 2/2002 | Yates | |
| 6,554,196 B2 * | 4/2003 | Sasayama et al. | 236/12.12 |
| 6,659,361 B2 * | 12/2003 | Sasayama et al. | 165/62 |
| 7,249,628 B2 * | 7/2007 | Pillion et al. | 165/11.1 |
| 2001/0003347 A1 | 6/2001 | Shimoda et al. | |
| 2002/0148485 A1 | 10/2002 | Taft et al. | |
| 2004/0068997 A1 | 4/2004 | Hirooka et al. | |
| 2005/0201747 A1 | 9/2005 | You et al. | |

* cited by examiner

*Primary Examiner*—Ljiljana (Lil) V Ciric
(74) *Attorney, Agent, or Firm*—Dorsey & Whitney LLP

(57) ABSTRACT

An apparatus for use with a process liquid for controlling the temperature of a semiconductor-processing target comprises first and second tanks adapted for holding process liquid, at least one fluid level sensor carried by the first tank for monitoring the amount of process liquid in the first tank, and a valve coupled to one of the at least one fluid level sensor and configured to increases the flow of process liquid from the second tank to the target when the amount of process liquid in the first tank drops to a first predetermined amount. The first tank may include first and second compartments partially separated by a divider with a top whereby process liquid in the first compartment flows over the top of the divider into the second compartment.

3 Claims, 2 Drawing Sheets

TEMPERATURE CONTROL APPARATUS AND METHOD

FIELD OF THE INVENTION

The present invention relates in general to controlling the temperature of a target, such as a semiconductor processing equipment, and particularly to a temperature control system employing a process liquid and method of operating the same.

BACKGROUND OF THE INVENTION

In many industrial applications, there is a need to control the temperature of a target. One such application is plasma processing in semiconductor device fabrication. A typical plasma processing apparatus includes a wafer processing chamber and a pedestal disposed in the wafer-processing chamber. The pedestal typically includes a chuck for holding a semiconductor workpiece or wafer. In the plasma processing apparatus, plasma formed with excited process gasses is used to etch or deposit layers of materials on the semiconductor workpiece or wafer. The plasma may additionally cause heating of various components of the plasma processing apparatus and/or the workpiece, which can undesirably affect the precision and repeatability of the processes performed by the plasma processing apparatus.

As feature sizes continue to decrease, there is an ever-increasing need to provide better temperature control to plasma processing apparatus in order to provide consistent and precise fabrication of semiconductor devices. For example, in plasma etching, a number of parameters within the wafer processing chamber need to be tightly controlled to obtain specified results, such as etch rate, etched feature profile, etch selectivity to underlying layers, etc. The parameters include the temperature of the chuck, the wall(s) and/or any other component of the wafer-processing chamber. Generally, the tolerance of the plasma processes used to fabricate semiconductor devices and the performance of the resulting semiconductor devices can be highly sensitive to temperature fluctuations during the plasma processes. Therefore, it is desirable to have a temperature management system and method that can achieve very accurate temperature control of the workpiece and/or components of the plasma processing apparatus.

SUMMARY OF THE INVENTION

The embodiments of the present invention provide an apparatus for use with a process liquid for controlling the temperature of a semiconductor-processing target. In one aspect, the apparatus comprises a first tank adapted for holding process liquid and having an inlet and outlet, a first liquid passageway connected to the outlet for returning process liquid to the target, and at least one fluid level sensor carried by the first tank for monitoring the amount of process liquid in the first tank. The apparatus further comprises a second tank adapted for holding process liquid, a second liquid passageway connected to the second tank to allow process liquid to flow from the second tank to the target, and a valve disposed in the second liquid passageway and coupled to one of the at least one fluid level sensor. The valve increases the flow of process liquid through the second liquid passageway when the amount of process liquid in the first tank drops to a first predetermined amount.

In another aspect, an apparatus for controlling the temperature of a target comprises a tank for holding process liquid, and a pump adapted to draw the process liquid from the second compartment toward the target. The tank has first and second compartments. The first compartment receives process liquid from the target and the second compartment supplies process liquid to the target. A divider with a top partially separates the first and second compartments. Process liquid in the first compartment flows over the top of the divider into the second compartment.

In yet another aspect, an apparatus for use with a process liquid for controlling the temperature of a target comprises a tank for holding process liquid and having an inlet for receiving the process liquid from the target and an outlet for returning the process liquid to the target, a pump having an input and an output and adapted to draw the process liquid out of the tank, a heat exchanger having a process liquid input and a process liquid output, a first liquid passageway fluidly coupling the output of the pump to the process liquid input of the heat exchanger, a second liquid passageway fluidly coupling the process liquid output of the heat exchanger and the inlet of the tank, at least one digital valve disposed in the second liquid passageway, and a controller coupled to the at least one digital valve and configured to determine a period of time to open the at least one digital valve to allow a portion of the process liquid from the output of the pump be diverted toward the tank through the heat exchanger.

DETAILED DESCRIPTION OF THE EMBODIMENTS

Figure 1:
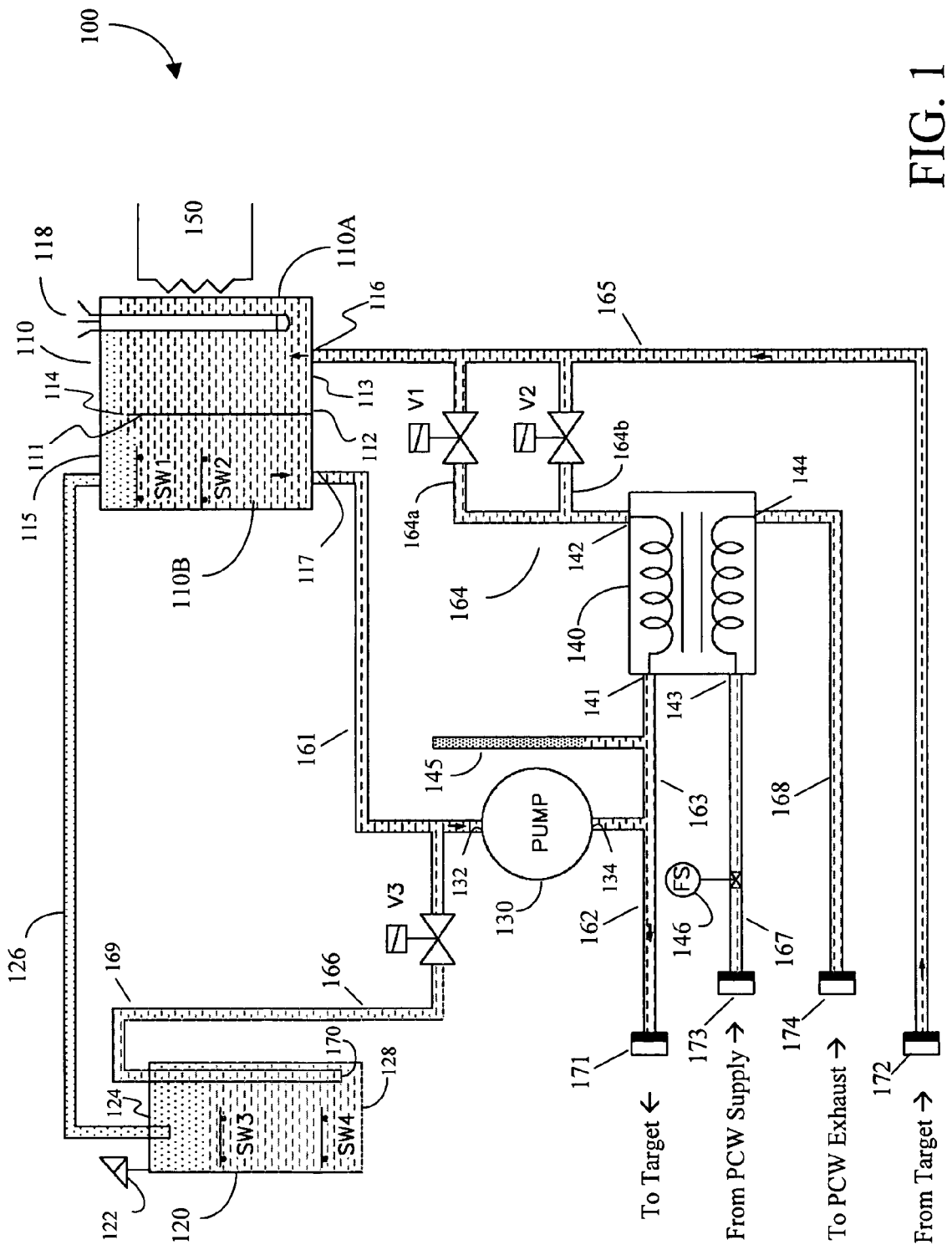
FIG. 1 is a block diagram of a system for use with a process liquid for controlling the temperature of a target according to one embodiment of the present invention.

FIG. 1 is a schematic diagram of one embodiment of a temperature control system 100 for controlling the temperature of a target (not shown) according to one embodiment of the present invention. System 100 is for use with a process liquid, such as fluorinet or diwaterglycol, that circulates between the target and the system 100. The target, for example, can be a workpiece chuck used to hold on its top surface a flat semiconductor workpiece or wafer during plasma processing, integrated circuit testing, or other procedures that may causing heating of the wafer so that control of the temperature of the chuck is desired. System 100, however, is not limited to controlling the temperature of a workpiece chuck, and can be used to control the temperature of any other target, such as the chamber walls of a plasma processing apparatus, either within or outside the semiconductor field.

System 100 includes a main tank or process tank 110 for holding a first reservoir of the process liquid, an expansion or autofill tank 120 for holding a second reservoir of the process liquid, a pump 130 for drawing process liquid from the main tank 110 and the expansion tank 120 toward the target, a heat exchanger 140, and a heater 150 for adjusting the temperature of the process liquid. In one embodiment, heater 150 is disposed near main tank 110 for heating up the process liquid therein when there is a need for it, and can be a generic heater, such as a tape heater, which is a flexible heater molded to the outer surface of at least one side of main tank 110.

Main tank 110 has two compartments 110A and 110B partially separated by a divider 111 that has a bottom 112 in contact with a bottom 113 of the tank 110 and a top 114 lower than a top 115 of the main tank 110. Compartment 110A and compartment 110B are connected near the top 115 of the main tank 110. Compartment 110A serves as a recipient of process liquid from the target, and compartment 110B serves as a supplier of process liquid that is pumped by pump 130 toward the target. Main tank 110 further includes an inlet 116 for receiving process liquid from the target into compartment 110A and an outlet 117 for returning the process liquid to the target from compartment 110B. Main tank 110 further includes at least one sensor for monitoring the amount of process liquid in the main tank.

In one embodiment, the at least one sensor includes a first fluid level sensor SW1 for sensing whether the process liquid in compartment 110B has dropped below a first fluid level and a second fluid level sensor SW2 for sensing whether the process liquid in compartment 110B has dropped below a second fluid level substantially lower than the first fluid level. Main tank 110 further includes a temperature sensor 118 for sensing the temperature of the process liquid in the main tank.

Expansion tank 120 also includes at least one sensor for monitoring the amount of process liquid therein. In one embodiment, the at least one sensor in expansion tank 120 includes a third fluid level sensor SW3 for sensing whether the process liquid in expansion tank 120 has dropped below a third fluid level, and a fourth fluid level sensor SW4 for sensing whether the process liquid in expansion tank 120 has dropped below a fourth fluid level. Expansion tank 120 further includes a check valve 122 at or near a top 124 of expansion tank 120, which provides a bleed into the atmosphere while preventing liquid or gas in the expansion tank from leaking out. A pipe or tube 126 can be provided to provide a gas channel between the top of main tank 110 and the top of expansion tank 120 so that both tanks are under atmospheric pressure.

In one embodiment, pump 130 is a centrifugal pump having an input 132 and an output 134. Pump 130 can be a negative pressure pump that sucks in process liquid at its input 132 and expels process liquid at its output 134. Heat exchanger 140 has two sides, a process liquid side having a process liquid input 141 and a process liquid output 142, and a cooling liquid side having a cooling liquid input 143 and a cooling liquid output 144.

System 100 further includes a first fluid path 161 between outlet 117 of main tank 110 and input 132 of pump 130, a second fluid path 163 between output 134 of pump 130 and the target, a third fluid path 163 between output 134 of pump 130 and process liquid input 141 of heat exchanger 140, a fourth fluid path 164 between process liquid output 142 of heat exchanger 140 and inlet 116 of main tank 110, and a fifth fluid path 165 between the target and inlet 116 of main tank 110. The third fluid path may include a shock absorber 145. The second and third fluid paths 162 and 163 may partially overlap with each other, especially near output 134 of pump 130. The fourth and fifth fluid paths 164 and 165 may partially overlap with each other, especially near inlet 116 of main tank 110. In one embodiment, the fourth fluid path 164 has a middle section that is split into two branches 164a and 164b, and system 100 further includes valves V1 and V2 disposed in branches 164a and 164b for controlling the flow of process liquid through branches 164a and 164b, respectively.

System 100 further includes a sixth fluid path 166 between expansion tank 120 and input 132 of pump 130, and an autofill valve V3 disposed in the sixth fluid path 166. In one embodiment, the sixth fluid path includes a U-shaped section 169, which has an end 170 disposed near a bottom 128 of expansion tank 120, and which extends from the end 170 to and through the top 124 of expansion tank 120 and then bends down toward pump 130. Alternatively, the sixth fluid path 166 may extend from a leak proof outlet at the bottom of expansion tank 120, which may be similar to outlet 177 of main tank 110, to input 132 of pump 130, but a leak proof outlet may cost more to make and maintain than the U-shaped section 169. The first and sixth fluid paths 161 and 166 may partially overlap with each other, especially near input 132 of pump 130. Valve V3 is controlled by the first fluid level sensor SW1, such that it is closed when the process liquid in compartment 110B is above the first fluid level, and that it opens when the first fluid level sensor SW1 senses that the process liquid in compartment 110B has dropped below the first fluid level. The fluid paths in system 100, including the first to the sixth fluid paths, can be implemented using pipes or tubes.

In one embodiment, external fluid paths (not shown) are provided to allow the process liquid to circulate between system 100 and the target, which may include a first external fluid path (not shown) connected with the second fluid path 162 via a first compression fitting 171 and a second external fluid path (not shown) connected with the fifth fluid path 165 via a second compression fitting 172. Similarly, the cooling liquid input 143 of heat exchanger 140 may be connected with a cooling liquid supply (not shown) through a liquid path 167 and a third compression fitting 173, and the cooling liquid output 144 of heat exchanger 140 may be connected with a cooling liquid exhaust (not shown) through a liquid path 168 and a fourth compression fitting 174. This way, the cooling liquid, such as process-cooled water (PCW), may flow through the cooling liquid side of heat exchanger 140 to cool the process liquid that may flow through the process liquid side of heat exchanger 140. A flow switch 146 may be provided and disposed in liquid path 167 to control the cooling liquid flow therethrough.

During the operation of system 100, the first fluid level sensor SW1 in main tank 100 controls autofill valve V3 such that each time when the process liquid level in compartment 110B of main tank 100 goes below the first fluid level, fluid level sensor SW1 is activated and causes autofill valve V3 to open the sixth fluid path 166 or increase the flow of process liquid therethrough. With the sixth fluid path 166 open, process liquid is pumped toward the target by pump 130 from expansion tank 120 as well as compartment 110B of main tank 110. Pump 130, which is a negative pressure pump, sucks the process liquid, or develop the differential pressure, to pull the process liquid out of expansion tank 120 through autofill valve V3 and into the main stream of the process liquid flow, which includes the flow of process liquid from pump 130 to the target and back from the target to compartment 110A of main tank 110. By adding process liquid from expansion tank 120 to the main stream of process liquid flow, process liquid from expansion tank 120 is added to the process liquid in main tank 110 to compensate for the deficiency thereof. When the process liquid in compartment 110B reaches the first fluid level, fluid level sensor SW3 is deactivated and causes the autofill valve V3 to close the sixth fluid path 166 or decrease the flow therethrough, until the next time when compensation for process liquid in main tank 100 is required.

The fluid level sensors SW3 and SW4 in expansion tank 120 also have specific purposes. Before system 100 starts operation, fluid level sensor SW3 gives indication as to the level of process liquid at which the expansion tank should be filled. This process liquid level, which is the third process liquid level, is set based on the coefficient of expansion of the process liquid so that sufficient extra room for expansion is provided to avoid overflowing of expansion tank 120 when the temperature of the process liquid is driven higher than the room temperature during the operation of system 100.

The fourth fluid level sensor SW4 serves to indicate that refilling of expansion tank 120 is needed when the process liquid level in expansion tank 120 drops below the fourth process liquid level, which is sitting below the third fluid level sensor near the bottom 128 of expansion tank 120. This means that when the process liquid in expansion tank 120 is nearly consumed, a signal is sent to indicate that expansion tank 120 need to be refilled for system 100 to continue normal operation. If this signal is ignored or missed such that no action is taken, system 100 will start losing process liquid in main tank 110 and when the process liquid level in compartment 110B in main tank 110 drops below the second fluid level, the second fluid level sensor SW2 will be activated, which calls for emergency stop and sends a notification that within a predetermined amount of time, such as 10 minutes, system 100 will be shut off. When system 100 is used for controlling temperature of a part of a wafer processing apparatus, the predetermined amount time may be set to allow the processing of a last wafer.

In a conventional temperature control system, only one process liquid tank is provided, and should the process liquid in the process liquid tank fall below a certain level, the system would have to be shut down in order for the process liquid tank to be refilled. With the inclusion of expansion tank 120, system 100 is advantageous over conventional temperature control systems because it provides the advantage of continued operation during process liquid refill. As discussed above, if the process liquid in compartment 110B in main tank 110 becomes too low, process liquid from expansion tank 120 can be added to compensate the process liquid in circulation and system 100 can remain in operation. If the amount of process liquid in expansion tank 120 falls below a certain level, i.e., the fourth fluid level, expansion tank 120 can be refilled without requiring system 100 be shut down.

As described above, main tank or process tank 110 has two compartments 110A and 11B. Compartment 110A serves as a recipient of process liquid returning back from the target, and compartment 110B serves as the supply for pump 130 to get process liquid back into circulation. This inventive feature allows gaseous components in the process liquid in compartment 110A to bubble up and escape the process liquid before the process liquid is put back into circulation. Some process liquid, such as the diwaterglycol mixture, tends to generate a lot of air, or a lot of steam, at higher temperature. The air or steam bubbles up, and when the process liquid with bubbles therein is provided to the pump, which is a centrifugal pump having a turbine running at very high revolutions per minute, cavitation may result when the turbine is covered with bubbles from the process liquid, and cavitation may cause the turbine to stop pumping. Main tank 110 with the partially separated compartments 110A and 110B allows easy separation of gases or bubbles from the process liquid by letting the gases or bubbles in the process liquid in compartment 110A flow up toward the top 115 of main tank 110 while the process liquid overflows the divider 112 into compartment 110B. The process liquid in compartment 110B is thus essentially gas free and allows the pump to operate free of cavitation. The separated gas in main tank 110 has the channel 126 to go into expansion tank 120 and escape into the atmosphere through the bleed 122 in the expansion tank.

Some of the gases or bubbles may include steam from the process liquid so that, after reaching to the top of main tank 110 and/or through channel 126 to expansion tank 120, they may condense and drip down to rejoin the process liquid in the tanks. Certain process liquid, such as fluorinet, has a tendency to absorb a lot of different gases, such as oxygen, nitrogen and other trapped gases. These gases or bubbles are outgases and would normally escape into the atmosphere after the temperature of the process liquid is increased.

When it is desired to cool the process liquid in main tank 110, either or both of valves V1 and V2 are opened, and some of the process liquid from output 134 of pump 130 is diverted toward heat exchanger 140 from the process liquid flow out to the target. The diverted portion of the process liquid travels through heat exchanger 140 and is cooled by the cooling liquid before being reintroduced back into main tank 110 through valves V1 and/or V2. The cooling liquid can be facility water at, for example, 25° C. In one embodiment, both valves V1 and V2 are digital valves, which can be on/off valves each including a closure device that is either on or off and is driven by a solenoid. To cool the process liquid, valve V1 or V2 is opened for an amount of time dependent on the difference between the current temperature and a desired temperature for the process liquid, which is dependent on an operating temperature of the target. The shock absorb 145 may include trapped air, which helps to smooth possible shock effects caused by the valves V1 and V2 being turned on and/or off.

In one embodiment, both valves V1 and V2 are included in system 100 and valve V2 has a smaller orifice than valve V1 to provide a relatively large operating temperature range for the target. For example, an operating temperature range of about 35° C. to about 80° C. may be increased to a broader operating temperature range of about 35° C. and about 130° C. by the inclusion of valve V2 in addition to valve V1. In one embodiment, the broader temperature range is partitioned into a lower temperature range and a higher temperature range, which may overlap to a certain extent near the higher end of the lower temperature range or the lower end of the higher temperature range. When the operating temperature of the target or the temperature of the process liquid in main tank 110 is in the lower temperature range, valve V1 with the large orifice is preferred, and when the operating temperature of the target or the temperature of the process liquid in main tank 110 is in the higher temperature range, valve V2 with the smaller orifice is preferred. This is due to the fact that less cooled process liquid is required to make, for instance, a one degree temperature change, when the process liquid in main tank 110 is in the higher temperature range than when it is in the lower temperature range. As stated before, there can be some overlap of, for instance, about 15° C., in the temperature ranges for the two valves V1 and V2. Valves V1 and V2, however, are usually separately utilized.

System 100, with the dual digital valves V1 and V2 and other inventive features, is advantageous over conventional temperature control systems. In conventional temperature control system, instead of two digital valves with different orifices, a single analog valve is used to reintroduce the cooled process liquid from the heat exchanger to the process liquid tank. The analog valve is typically a slow moving valve and would include, for instance, a closure device and a motor hooked up to a shaft which rotates the closure device so that it slowly opens and closes. Instead of a strict opening or closing, the opening of the analog valve can be varied to control the amount of process liquid flowing through the valve. When the process liquid in a conventional temperature control system needs to be cooled, the analog valve is opened to some degree to make adjustment of the process liquid temperature. Because the analog valve opens and closes slowly, the process liquid temperature is usually over-adjusted to undershoot the desired temperature, and then heater 150 is used to bring the process liquid back to the desired temperature. The inefficiencies of such a system are two fold. First, the valve is moving very slowly, and second, heating as well as cooling are provided to cool the process liquid. System 100, on the other hand, is more efficient because it does not engage the heater 150 to provide fine temperature adjustments of the process liquid. System 100 can also operate in a broader temperature range than conventional temperature control systems.

Figure 2:
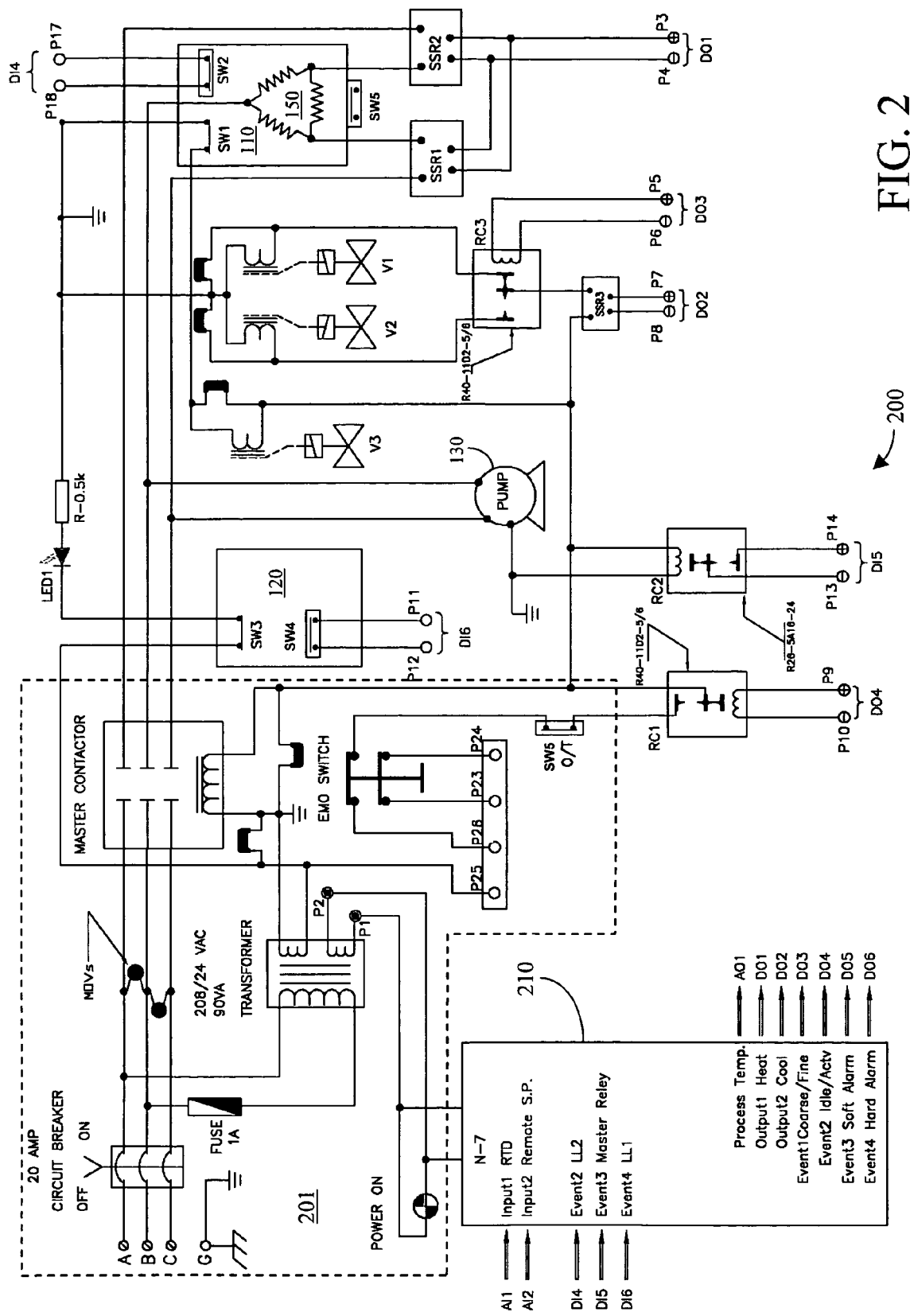
FIG. 2 is a block diagram of a control system associated with the system illustrated in FIG. 1.

Referring now to FIG. 2, according to one embodiment of the present invention, a control system 200 associated with system 100 includes a power supply unit 201 configured to provide appropriate levels of power for various parts of control system 200, and a controller 210 configured to control the operation of system 100. Controller 210 is shown to receive a plurality of inputs, such as inputs AI1, AI2, DI4, DI5, and DI6, and to produce a plurality of outputs, such as outputs AO1, DO1, DO2, DO3, DO4, DO5, and DO6. Control system 200 further includes a plurality of control circuits each having a terminal pair for coupling to an input or output of controller 210, including terminal pairs P3/P4, P5/P6, P7/P8, P9/P10, P11/P12, P13/P14, P15/P16, and P17/P18. In addition to fluid level sensors SW1, SW2, SW3, and SW4, valves V1, V2 and V3, temperature sensor 118, heater 150, the plurality of control circuits further include a light-emitting diode LED1, resistor-capacitor circuits RC1, RC2, RC3, and solid-state relays SSR1, SSR2, and SSR3, which are solid-state switching devices each configured to electrically complete or interrupt a circuit without moving parts.

As shown in FIG. 2, in one embodiment, fluid level sensors SW1, SW2, SW3, and SW4 are switches that turns off in response to the process liquid in tank 110 or 120 having dropped below the first, second, third, and fourth fluid levels, respectively, and temperature sensor 118 is a resistive temperature device (RTD) disposed in compartment 110A that changes resistance at predetermined rate in response to changes in the temperature of the process liquid in main tank 110. Input AI1 is coupled to the resistive temperature device 118 (not shown in FIG. 2) through terminal pair P17/P18 to receive its reading of the process liquid temperature in main tank 110; input AI2 is coupled to a remote set-point device to receive a desired operating temperature for the target; input DI4 is coupled to switch SW2 through terminal pair P17/P18 to allow controller 210 to respond to an event (Event 2) when the process liquid level in compartment 110B of main tank 110 drops below the second liquid level; input DI5 is coupled to pump 130 through resistor-capacitor circuit RC2 and terminal pair P13/P14 to allow controller 210 to respond to an event (Event 3) of some type of pump failure; and input D16 is coupled to switch SW4 through terminal pair P11/P12 to allow controller 210 to respond to an event (Event 4) when the process liquid level in expansion tank 120 drops below the fourth liquid level.

As also shown in FIG. 2, output DO1 is coupled to heater 150, which can be a 3-phase heater, through terminal pairs P3/P4 and solid-state relays SSR1 and SSR2. Controller 200 through its intelligence may determine that heating of the process liquid in main tank 110 is required and how much heating is required based on the difference between the received temperature reading from RTD 118 and a desired temperature for the process liquid. Controller 110 then by way of output DO1 turns all or part of heater 150 on for a time period according to the determined amount of heating.

Output DO2 is coupled to digital valves V1 and V2 through terminal pair P7/P8 and solid-state relay SSR3, and output DO3 is coupled to digital valves V1 and V2 through terminal pair P5/P6 and resistor-capacitor circuit RC3. As discussed above, controller 210 receives the temperature reading from RTD 118 at input AI1. Based on the received temperature reading from RTD 118 and the desired temperature of the process liquid, controller 210 may determine using its intelligence that the process liquid in main tank 110 needs to be cooled. Controller 210 may also have information about a desired operating temperature for the target and receives a current temperature of the target at input AI2. Thus, controller 210 may also determine that cooling of process liquid is required if the target is at a temperature higher than the desired operating temperature.

Further, based on whether the operating temperature of the target or the temperature of the process liquid in main tank 110 is in the higher temperature range or the lower temperature range, as discussed above, controller 210 also determines which one of valves V1 and V2 to open and a time period it should stay opened in order to cool the process liquid in main tank 110 to a desired temperature. Output DO3 is used to select either valve V1 or valve V2 to turn on, and output DO2 is used to open the selected valve quickly, and then closes it after the time period, so that the process liquid in main tank 110 can be cooled to a temperature that will provide the desired operating temperature at the target.

Output DO4 is coupled to the power supply network 201 through terminal pair P9/P11 and resistor-capacitor circuit RC1, and is used to turn system 100 to an idle state in response to Event 2 when the process liquid level in compartment 110B of main tank 110 has dropped below the second fluid level; output DO5 is used to send a soft alarm in response to Event 3 when there is some type of pump failure; and output DO6 is used to send a hard alarm that expansion tank 120 needs refill in response to Event 4 when the process liquid level in expansion tank 120 has dropped below the fourth liquid level.

As also shown in FIG. 2, switch SW1 is coupled to valve V3, which can be a conventional digital valve. So, the opening and closing of valve V3 depends on whether switch SW1 is off or on, which depends on whether process liquid in compartment 110B of main tank 110 is below or above the first liquid level. Control system 200 further includes a liquid fill indicator, such as the light emitting diode LED 1, that is coupled to switch SW3 and that turns on when expansion tank 120 is filled with process liquid to the third liquid level.

Thus, the embodiments of the present invention further provide a method for controlling the temperature of a target using a process liquid and an apparatus including first and second tanks each adapted to hold a portion of the process liquid. The method comprises the steps of directing process liquid from the first tank to the target, receiving a first indication that the process liquid in the first tank has dropped below a first predetermined level, and directing process liquid from the second tank to the target in response to such first indication. The method further comprises the steps of receiving a second indication that the process liquid in the first tank has returned to the first predetermined level, and decreasing the flow of process liquid from the second tank to the target in response to such second indication.

The method may further comprise the steps of receiving a third indication that a process liquid level in the second tank has dropped below a second predetermined level, and outputting a signal indicating that the second tank needs a refill of the process liquid.

The method may further comprise the steps of receiving a fourth indication that the process liquid level in the second tank has reached a third predetermined level higher than the second predetermined level and outputting a signal indicating that no more refill is needed for the second tank.

The method may further comprise the steps of receiving a fifth indication that the process liquid level in the first tank has dropped below a fourth predetermined level lower than the first predetermined level, and outputting an emergency signal.

The embodiments of the present invention further provide a second method of controlling the temperature of a target using an apparatus having a tank adapted to carry a process liquid for circulation between the apparatus and the target, a pump for drawing the process liquid from the tank toward the target, and a heat exchanger coupled to an output of the pump for cooling the process liquid therefrom. The second method comprises the steps of receiving a temperature reading of the process liquid or the target, computing a time period based on a difference between the temperature reading and a temperature value, and opening at least one digital valve for the time period to allow a portion of the process liquid coming out of the pump be diverted to the tank through the heat exchanger. The temperature reading is selected from the group consisting of a temperature reading of the target and a temperature reading of the process liquid; and the temperature value is selected from the group consisting of a desired temperature for the target and a desired temperature for the process liquid.

The second method may further comprise, before the computing step, the step of determining whether one of the temperature value and the temperature reading is in a lower or higher temperature range. The computing step may include computing the time period as a function of whether one of the temperature value and the temperature reading is in the lower or higher temperature ranges.

The opening step may include opening the first digital valve when one of the temperature value and the temperature reading is in the higher temperature range, and opening the second digital valve when one of the temperature value and the temperature reading is in the lower temperature range.

The embodiments of the present invention further include a controller configured to perform the second method.

While this invention has been particularly shown and described with references to preferred embodiments thereof, it will be understood by those skilled in the art that various changes in form and details may be made therein without departing from the spirit and scope of the invention as defined in the following claims.

What is claimed is:

1. An apparatus for use with a process liquid for controlling the temperature of a target, comprising a tank adapted for holding the process liquid and having an inlet for receiving the process liquid from the target and an outlet for returning the process liquid to the target, a pump for drawing the process liquid out of the tank and having an input and an output, a heat exchanger having a process liquid input and a process liquid output, a first liquid passageway for fluidly coupling the output of the pump to the process liquid input of the heat exchanger, a second liquid passageway for fluidly coupling the process liquid output of the heat exchanger to the inlet of the tank and including a middle section that bifurcates into first and second branches, first and second digital valves disposed respectively in the first and second branches of the second liquid passageway, and a controller coupled to the first and second digital valves and configured to determine a period of time to open the first digital valve when a temperature value is in a lower temperature range and to open the second digital valve when the temperature value is in a higher temperature range so as in each case to allow a portion of the process liquid from the output of the pump to be diverted toward the tank through the heat exchanger, the temperature value being selected from the group consisting of a temperature reading of the target, a temperature reading of the process liquid, a desired temperature for the target, and a desired temperature for the process liquid.

2. The apparatus of claim 1 wherein the first digital valve has an orifice and the second digital valve has an orifice larger than the orifice of the first digital valve.

3. The apparatus of claim 1 further comprising a shock absorber coupled to one of the first and second liquid passageways and configured to smooth possible shock effects caused by the first and second digital valves being opened or closed.

* * * * *